United States Patent [19]

Hagiwara

[11] 4,174,024

[45] Nov. 13, 1979

[54] WARNING DEVICE FOR INDICATING WEAR OF FRICTION PADS IN DISC BRAKE

[75] Inventor: Yutaca Hagiwara, Fujisawa, Japan

[73] Assignee: Nissan Motor Company, Limited, Yokohama, Japan

[21] Appl. No.: 872,652

[22] Filed: Jan. 26, 1978

[30] Foreign Application Priority Data

Jan. 26, 1977 [JP] Japan .................. 52-7281[U]

[51] Int. Cl.² .................................................. F16D 66/02
[52] U.S. Cl. ................................. 188/1 A; 116/208;
188/73.5; 192/30 W
[58] Field of Search ................... 188/1 A, 73.5;
192/30 W; 116/114 Q

[56] References Cited

U.S. PATENT DOCUMENTS 3,958,666  5/1976  Hooten et al. ................. 188/1 A
4,034,857  7/1977  Kondo et al. .................. 188/1 A

FOREIGN PATENT DOCUMENTS 2020684  11/1971  Fed. Rep. of Germany .......... 188/73.5
2502726  7/1975  Fed. Rep. of Germany .......... 188/1 A Primary Examiner—George E. A. Halvosa
Attorney, Agent, or Firm—Schwartz, Jeffery, Schwaab, Mack, Blumenthal & Koch

[57] ABSTRACT

A disc brake is provided with a warning device or sensor made of a springy material. The sensor is mounted within an space between a friction disc and pad assembly and a yoke, and has a tongue portion formed with a section adapted to rub on a rotating disc at an area disposed outside of the contact surface. When a friction pad is worn out to a predetermined thickness, the section rubs on the disc, emitting an audible warning sound to alert the driver that something is wrong and he should take appropriate action.

3 Claims, 6 Drawing Figures

WARNING DEVICE FOR INDICATING WEAR OF FRICTION PADS IN DISC BRAKE

BACKGROUND OF THE INVENTION

The present invention relates to disc brakes and more particularly to warning devices for indicating wear of friction pads.

In a known friction pad wear warning device or sensor, at least one projection is imbedded in a friction pad. When the pad is worn out to a predetermined thickness, the projection flushes with the pad surface. When the brakes are applied to a rotating disc, the projection rubs on the rotating disc at an area disposed within the contact surface of the pad and emits a high pitched squeal. This squeal is to alert the driver that something is wrong and he should take appropriate action. The problem with this known sensor resides in the difficulty to imbed the projection in the pad because the distance between a pad backing plate and the rotatable disc is limited. Another problem is that the contact surface of the pad on the rotating disc will be scratched and worn because the projection rubs on the rotating disc. Still another problem is that imbedding the projection into the pad will require digging a hole for receiving the projection and welding the projection to the bottom of the hole. Still another problem is that upon exchange of a worn-out pad, the associated projection must also be changed.

SUMMARY OF THE INVENTION

It is therefore an object of the invention to provide a friction pad wear warning device or sensor which, if a friction pad is worn out, rubs on a rotatable disc at an area disposed outside of the contact surface of the friction pad when the brakes are applied and emits an audible warning sound accurately.

It is another object of the present invention to provide a friction pad wear warning device or sensor which is easy to construct and mount within a disc brake.

DETAILED DESCRIPTION OF THE PREFERRED EMBODIMENTS

Referring to FIGS. 1 to 4, a disc brake, in which both friction pads arranged on both sides of a rotating disc are actuated by a single piston mounted on one side of the disc, incorporating a first preferred embodiment of an audible on-board sensor will hereinafter be explained.

Figure 1:
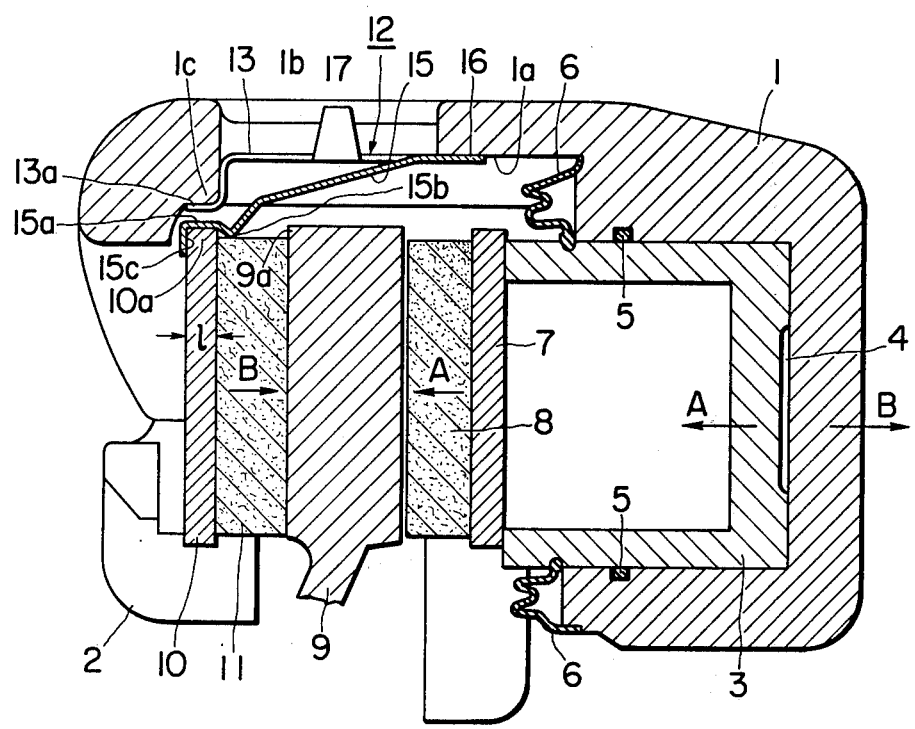
FIG. 1 is a sectional view of a disc-brake in which a first preferred embodiment of a friction pad wear warning device or sensor according to the invention is mounted.

In FIG. 1, denoted by the reference numeral 1 is a yoke. The yoke 1 is mounted on a portion of a vehicle body, not shown, via a torque receiver 2 for limited reciprocal movement.

Denoted by the reference numeral 3 is a hydraulic piston slidably mounted within a blind bore formed within the yoke 1. The piston 3 forms within the blind bore a hydraulic power chamber 4 and carries an oil seal ring 5 sealingly engaging the blind bore wall. Denoted by the reference numeral 6 is an annular dust cover which has an inner rim fitted to the piston 3 and an outer rim fitted to the adjacent portion of the yoke 1 in order to prevent entrance of dust and rain into a space between the piston 5 and the blind bore wall of the yoke 1.

Denoted by the reference numeral 7 is a pad backing plate fixed to the piston 3. Fixed to the backing plate 7 is a friction pad 8. Denoted by the reference numeral 9 is a disc rotatable with a wheel to be braked by the disc brake. The disc 9 is interposed between the pad 8 and another friction pad 11 fixed to another pad backing plate 10.

Figure 2:
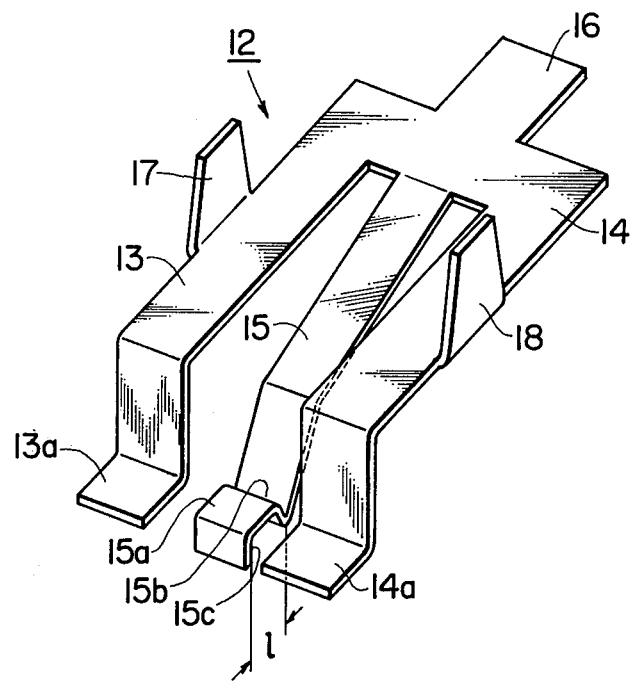
FIG. 2 is a perspective view of the sensor shown in FIG. 1.

Denoted by the reference numeral 12 is a friction pad wear sensor made of a springy sheet metal. As best shown in FIG. 2, the sensor 12 has a pair of elongate supporting portions 13 and 14 extending in parallel to each other and an elongate tongue portion 15 disposed between the supporting portions 13 and 14, and generally resembles a fork. The sensor 12 yieldably and rubbingly contacts with an area 1a of the yoke 1 at a flat portion 16 thereof (see FIGS. 1 and 2). The supporting portions 13 and 14 have finger sections 17 and 18, respectively, which extend through an aperture of the yoke 1 having two mutually facing spaced walls, only one being shown at 1b in FIG. 1, and contact with these two mutually facing spaced walls, respectively.

The supporting portions 13 and 14 are turned at their leading ends to form sections or flanges 13a and 14a, each being shaped to conform to and contacting with a shoulder portion 1c of the yoke 1 (see FIGS. 1 and 2).

The tongue portion 15 is turned at its leading end to form a hook section 15a which engages with an upper portion of an outer periphery of the pad backing plate 10. Formed on the tongue portion 15 between the hook section 15a and the flat portion 16 is a section 15b adapted to rub on the disc 9, the section 15b being in the form of an acute or V-shaped bend. The distance (l) as measured from an inner wall 15b of the hook section 15a to the center line of the V-shaped bend 15b must be determined so that if the pad 11 is worn out to a predetermined thickness, the recess 15b is brought into a rubbing contact with the disc 9 when brakes are applied. The remaining section of the tongue portion 15 which extends between the V-shaped bend 15b and the flat portion 16 is spaced from a corner edge 9a of the disc 9 so as not to contact with the pad 11 and the disc 9.

When, in operation, the brake pedal is pushed to admit a hydraulic fluid into the chamber 4, the piston 3 moves in one direction designated by an arrow A and the yoke 1 in the opposite direction designated by an arrow B. Then, the pad 8 fixed to the piston 3 moves in the one direction (designated by the arrow A) and the pad 11 is urged by the yoke 1 to move in the opposite direction (designated by the arrow B), frictionally engaging both sides of the disc 9, respectively, to brake the same.

When subsequently the brake pedal is released to relieve the pressure within the chamber 4, the piston 3 returns to a brake release position due to the oil seal ring 5 by the force of restitution of the oil seal ring 5 from its torsion, causing the pad 8 to disengage from the disc 9. However, because there is no such mechanism in connection with the pad 11, the pad remains in loose engagement with the disc 9 even if the brake pedal is released. Therefore the pad 11 wears at a faster rate than the pad 8.

Figure 3:
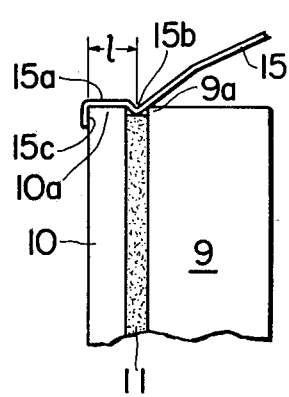
FIG. 3 is a fragmentary view of FIG. 1 showing a state when a friction pad is worn out to a predetermined thickness to cause the sensor to emit an audible warning sound.
Figure 4:
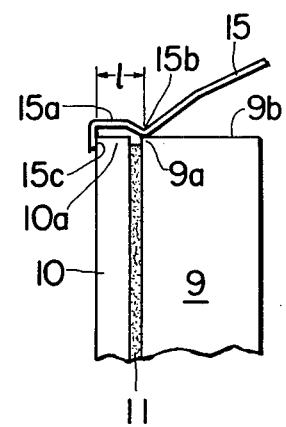
FIG. 4 is a fragmentary view of FIG. 1 showing a state when the pad is worn out further to cause the sensor to emit another audible warning sound.

As shown in FIG. 3, when the pad 11 has been worn out to the predetermined thickness, the section 15b of the tongue portion 15 contacts at its righthand side (viewing in FIG. 3) with the edge 9a of the disc 9 and emits an audible warning sound upon rotation of the disc 9. This sound is to alert the driver that something is wrong and he should take appropriate action.

If the driver does not take any action even if this sound is emitted, the pad 11 will be worn out further. When the pad 11 has been worn out further, the bottom of the section 15b bridges onto the periphery of the disc 9 to emit a larger audible warning sound. This sound continues to alert the driver.

Because, in this embodiment, the sensor 12 is fixedly held in the illustrated position in FIG. 1, the tongue portion 15 is always kept in an operable condition in which the warning sound is accurately emitted if the pad 11 is worn out to the predetermined thickness.

Figure 5:
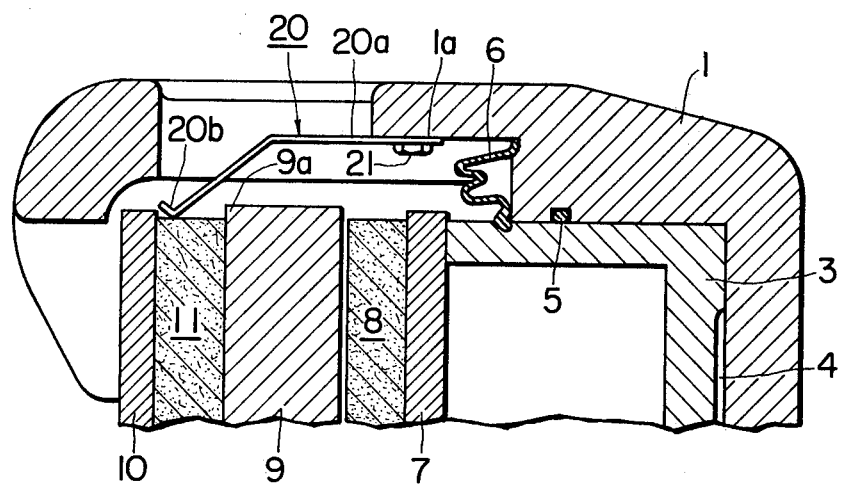
FIG. 5 is a similar view to FIG. 1 showing another preferred embodiment of a friction pad wear warning device or sensor.
Figure 6:
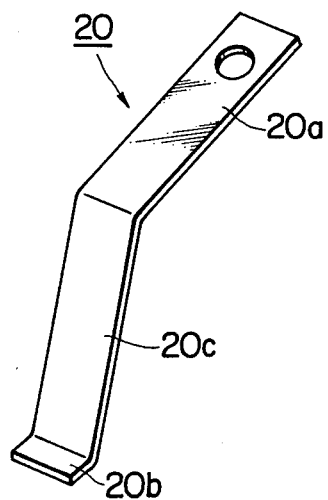
FIG. 6 is a perspective view of the sensor shown in FIG. 5.

FIG. 5 shows a different embodiment in which a sensor 20 is in the form of a strip made of a springy metal and has a flat portion 20a at which the sensor 20 is secured, by a bolt 21, a yoke 1 at an area 1a. The sensor 20 has a tongue portion 20c having its end turned to form a section 20b adapted to rub on a disc 9.

The section 20b contacts with the periphery of a friction pad 11 at such a position that if the pad 11 is worn out to a predetermined thickness, the section 20b contacts with the disc 9 at an edge 9a, emitting an audible warning sound, and if the pad 11 is worn out further, the section 20b will bridge on the periphery of the disc 9, emitting another audible warning sound.

The sensor 20 of this embodiment is simpler, in construction, than the sensor 12 of the first embodiment. Thus it is less costly and easier to manufacture.

Although in the preceding description, since the wearing rate of the pad 11 is faster than that of another pad 8, a sensor is provided for the pad 11 only, if the invention is applied to a disc brake having a pair of hydraulic pistons to actuate both of friction pads, two sensors should be provided for the both pads, respectively.

It will be appreciated as an advantage of the invention that, because a sensor is arranged within a space above the friction pad assembly within a yoke and it is not necessary to modify a pad or a pad backing plate to mount a sensor, which was the case in the prior art, assembly is easy and productivity is increased.

It will be appreciated as another advantage of the invention that, since when the pad is worn out the sensor will contact with the disc at an area disposed outside of its contact surface of the pad, the contact surface of the disc will not be scratched by the sensor.

It will also be appreciated as still another advantage of the invention that it is not necessary to exchange a sensor upon exchange of the worn out pad, and thus economy is improved.

What is claimed is:

1. A disc brake comprising:
   a friction disc capable of rotation with an element to be braked;
   a yoke straddling said disc and provided with a piston reciprocative axially with respect to said disc;
   first and second opposed backing plates respectively urgeable by said piston and said yoke toward the two opposite faces of said disc;
   first and second friction pads respectively carried on the opposing faces of said first and second backing plates; and
   a friction pad wear sensor mounted on said yoke and having a resilient tongue portion diverging from said yoke, said tongue portion having an acute bend portion adjacent to a peripheral surface of said second friction pad, said tongue portion coming first into contact with an edge of said disc defined by the junction of the face of said disc facing said second friction pad and the peripheral surface of said disc at a first predetermined level of wear of said second friction pad, whereby a first audible signal is generated by said sensor, and subsequently coming into contact with the peripheral surface of said disc at a point spaced from said edge at a second predetermined level of wear of said second friction pad, whereby a second audible signal is generated by said sensor.

2. A disc brake as claimed in claim 1, wherein said sensor takes the form of a single strip of material secured at one end to said yoke and bent to define said tongue portion.

3. A disc brake comprising:
   a friction disc capable of rotation with an element to be braked;
   a yoke straddling said disc and provided with a piston reciprocative axially with respect to said disc, said yoke also having formed thereon an aperture having two spaced opposed walls;
   first and second opposed backing plates respectively urgeable by said piston and said yoke toward the two opposite faces of said disc;
   first and second friction pads respectively carried on the opposing faces of said first and second backing plates; and
   a friction pad wear sensor interconnectingly disposed between said yoke and said second backing plate comprising:
   a flat portion in contact with said yoke;
   two elongate supporting members projecting away from said flat portion, each of said supporting members being bent near the free ends thereof to define flanges at the free ends thereof, said flanges extending in a direction substantially parallel with said flat portion and adapted to contact shoulder portions of said yoke;
   two finger sections, each of which is formed integrally with one of said supporting members and arranged to extend substantially perpendicularly with respect to said supporting members, said finger sections engaging said spaced opposed walls of said yoke; and
   a tongue portion diverging with respect to said two elongate supporting members and having formed at the free end thereof a hook portion which engages the peripheral surface of said second backing plate and also having an acute bend immediately before the hook portion; said tongue portion first coming into contact with an edge of said disc defined by the junction of the face of said disc facing said second friction pad and the peripheral surface of said disc upon said second friction pad wearing down to a first predetermined thickness, whereby a first audible signal is produced by said sensor, and said acute bend portion of said tongue portion subsequently riding up onto said peripheral surface of said disc at a point spaced from said edge upon said second friction pad wearing down to a second predetermined thickness less than said first predetermined thickness, whereby a second audible signal is produced by said sensor.

* * * * *